United States Patent [19]

Sangret

[11] Patent Number: 5,771,989

[45] Date of Patent: Jun. 30, 1998

[54] POWER STEERING SYSTEM

[75] Inventor: Henry C. Sangret, St. Clair Shores, Mich.

[73] Assignee: TRW Inc., Lyndhurst, Ohio

[21] Appl. No.: 608,135

[22] Filed: Feb. 28, 1996

[51] Int. Cl.$^6$ .................................................. B62D 5/083
[52] U.S. Cl. ............................................................. 180/423
[58] Field of Search .................................... 180/417, 421, 180/422, 423, 441

[56] References Cited

U.S. PATENT DOCUMENTS

| | | | |
|---|---|---|---|
| 4,583,610 | 4/1986 | Hasegawa | 180/421 |
| 4,819,545 | 4/1989 | Dymond . | |
| 4,871,040 | 10/1989 | Zuraski et al. . | |
| 4,886,137 | 12/1989 | Pawlak et al. . | |
| 4,886,138 | 12/1989 | Graber et al. . | |
| 5,046,573 | 9/1991 | Jones | 180/423 |
| 5,070,956 | 12/1991 | Pawlak et al. . | |
| 5,070,958 | 12/1991 | Goodrich et al. | 180/423 |
| 5,078,226 | 1/1992 | Inagaki et al. . | |
| 5,293,954 | 3/1994 | Dymond . | |
| 5,452,642 | 9/1995 | Dymond | 180/422 |
| 5,517,096 | 5/1996 | Shtarkman et al. | 180/423 |
| 5,667,034 | 9/1997 | Jones et al. | 180/422 |

*Primary Examiner*—Paul N. Dickson
*Attorney, Agent, or Firm*—Tarolli, Sundheim, Covell, Tummino & Szabo

[57] ABSTRACT

An apparatus for use in a vehicle to control a flow of fluid to a power steering motor includes inner and outer valve members (40 and 42) which are disposed in a housing (44) and are rotatable relative to each other to control fluid flow to a power steering motor (31). A force transmitting assembly (114) is provided to resist relative rotation between the inner and outer valve members (40 and 42) with a force which varies as a function of variations in force applied against the force transmitting assembly. An actuator member (130) is provided to apply force against the force transmitting assembly (114). A power steering resistance control system (110) includes a coil (128) which provides a magnetic field which acts on the actuator member (130). A speed responsive control unit (112) is effective to vary the strength of the electromagnetic field provided by the coil (128) with variations in vehicle speed to thereby vary the force which is transmitted through the actuator member (130) to the force transmitting assembly (114) as a function of variations in vehicle speed.

16 Claims, 3 Drawing Sheets

5,771,989

POWER STEERING SYSTEM

BACKGROUND OF THE INVENTION

The present invention relates to a vehicle power steering system and more specifically to a vehicle power steering system in which the resistance to actuation of a power steering motor control valve is varied.

A known vehicle power steering system is disclosed in U.S. Pat. No. 4,819,545. The power steering system disclosed in this patent includes a control valve assembly having a resistance to actuation which increases as vehicle speed increases. A speed responsive control unit is connected in fluid communication with a pressure responsive control unit in the valve assembly. The construction of this known power steering system would be improved if the construction of the pressure responsive control unit was simplified to reduce system backpressure with an increase in fuel economy and a decrease in system operating temperatures.

SUMMARY OF THE INVENTION

The present invention provides a new and improved apparatus for use in a vehicle to control a flow of fluid to a power steering motor. The apparatus includes first and second valve members which are disposed in a housing and are rotatable relative to each other to control fluid flow from a fluid supply conduit to the power steering motor. A force transmitting assembly is provided to resist relative rotation between the first and second valve members with a force which varies as a function of variations in force applied against the force transmitting assembly. An electromagnetic device provides a magnetic field which acts on an actuator member to vary the force transmitted through the actuator member to the force transmitting assembly.

The electromagnetic device includes a coil which is disposed within the housing. The coil is electrically energizeable to provide a variable magnetic field. The strength of the magnetic field may vary as a function of variations in vehicle speed. The actuator member varies the force applied against the force transmitting assembly as a function of variations in the magnetic field provided by the coil.

BRIEF DESCRIPTION OF THE DRAWINGS

The foregoing and other features of the present invention will become more apparent upon a consideration of the following description taken in connection with the accompanying drawings, wherein.

DESCRIPTION OF ONE SPECIFIC PREFERRED EMBODIMENT OF THE INVENTION

Power Steering System—General Description

Figure 1:
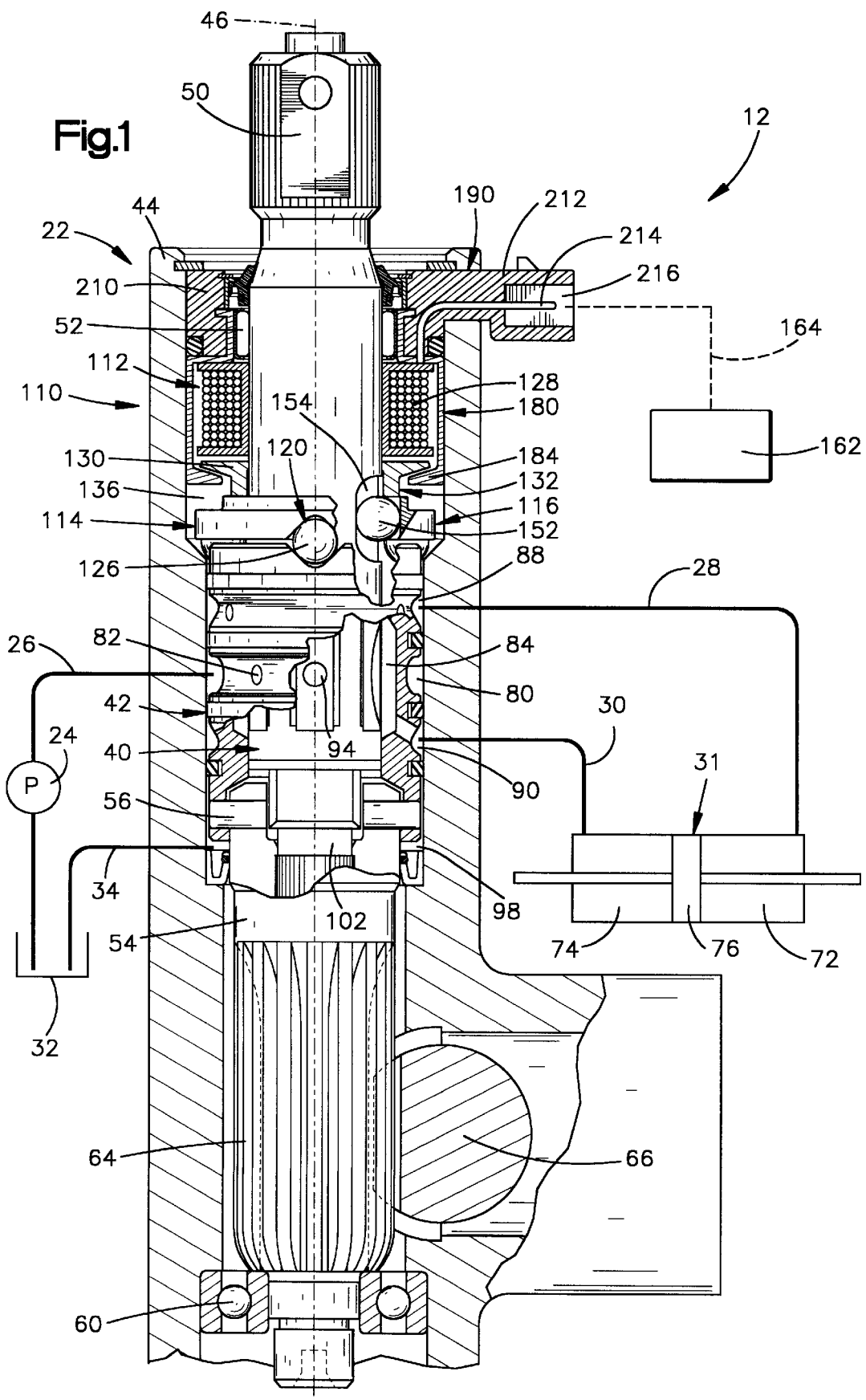
FIG. 1 is a sectional view of a power steering control valve which is used in a vehicle to control a flow of fluid to a power steering motor.

A vehicle power steering system 12 (FIG. 1) is operable to turn steerable vehicle wheels upon rotation of a steering wheel by an operator of the vehicle. Rotation of the steering wheel actuates a power steering control valve 22 to port fluid from an engine driven pump 24 and supply conduit 26 to either one of a pair of motor conduits 28 and 30. The high pressure fluid conducted from the supply conduit 26 through one of the motor conduits 28 or 30 effects operation of a power steering motor 31 to turn the steerable vehicle wheels. Fluid is conducted from the motor 31 to a reservoir 32 through the other one of the motor conduits 28 or 30, the power steering control valve 22, and a return conduit 34.

The power steering control valve 22 includes an inner motor control valve member 40 and an outer motor control valve member or sleeve 42. The outer motor control valve member 42 is cylindrical and encloses the inner motor control valve member 40. The inner motor control valve member 40 and outer motor control valve member 42 are rotatable relative to each other and to a housing 44 about a common central axis 46.

The inner valve member 40 is formed as one piece with a cylindrical input member or valve stem 50 which is connected with the steering wheel. The valve stem 50 is rotatably supported by bearings 52. The one piece outer valve member 42 is connected with a follow-up member 54 by a pin 56.

The follow-up member 54 is rotatably supported in the housing 44 by bearings 60. The follow-up member 54 also provides a pinion gear 64 which is disposed in meshing engagement with a rack 66. The rack 66 is connected with the power steering motor 31 and steerable vehicle wheels.

The power steering control valve 22 (FIG. 1) is of the open center type. Therefore, when the power steering control valve is in an initial or unactuated condition, fluid pressure from the pump 24 is conducted through the motor conduits 28 and 30 to motor cylinder chambers 72 and 74 on opposite sides of a piston 76 in the power steering motor 31. Also, fluid flow from the pump 24 is directed by the power steering control valve 22 to the return conduit 34 and reservoir 32.

Upon rotation of the steering wheel and rotation of the valve stem 50, the inner valve member 40 is rotated about the axis 46, relative to the housing 44 and outer valve member 42. This directs high pressure fluid from the pump 24 to one of the motor conduits 28 or 30 and directs fluid from the other motor conduit to the reservoir 32.

For example, rotation of the inner valve member 40 in one direction relative to the outer valve member 42 will reduce the extent of communication of the motor conduit 28 with the reservoir 32 and increase the extent of communication of the motor conduit 28 with the pump 24. This results in high pressure fluid from the pump 24 being conducted to the motor cylinder chamber 72. This high pressure fluid moves the piston 76 toward the left (as viewed in FIG. 1). As the piston 76 moves toward the left (as viewed in FIG. 1), fluid discharged from the chamber 74 is conducted through the motor conduit 30 to the reservoir 32 through the return conduit 34.

As the power steering motor 31 operates, the rack 66 rotates the pinion 64 and follow-up member 54. This rotates the outer valve member 42 relative to the inner valve member 40. When the power steering motor 31 is operated to turn the steerable vehicle wheels 14 and 16 to an extent corresponding to the extent of rotation of the inner valve member 40, the rack 66 rotates the pinion 64 through a distance sufficient to move the outer valve member 42 to its initial position relative to the inner valve member. When this occurs, the fluid pressure in the motor cylinder chambers 72 and 74 equalizes and the motor 31 stops operating.

When the power steering control valve 22 is in the initial position, fluid pressure from the pump 24 is conducted to an annular central groove 80 formed in the outer valve member 42. Fluid flows to the inside of the cylindrical outer valve member 42 through a pair of diametrically opposite passages 82. The inner valve member 40 cooperates with axially extending grooves 84 formed inside the outer valve member 42. The ends of one pair of diametrically opposite grooves 84 on the inside of the outer valve member 42 are connected in fluid communication with an annular outer groove 88 connected with the motor conduit 28. A second pair of diametrically opposite and axially extending grooves 84 on the inside of the outer valve member 42 are connected in fluid communication with an annular outer groove 90 formed in the outer valve member and connected with the motor conduit 30.

A pair of diametrically opposite openings 94 extend radially inward to an axially extending central passage in the inner valve member 40. The central passage is connected in fluid communication with an annular return chamber 98 (FIG. 1) disposed below the outer valve member 42. The chamber 98 is connected in fluid communication with the reservoir 32 by the return conduit 34.

The inner and outer valve members 40 and 42 are interconnected by a torsion bar 102, which is only partially shown in FIG. 1. The torsion bar 102 is disposed in the axially extending return fluid passage in the inner valve member 40. One end of the torsion bar 102 is connected to the valve stem 50 and the opposite end of the torsion bar is connected to the follow-up member 54. The torsion bar 102 twists to enable relative rotation between the inner and outer valve members 40 and 42 to occur and when free urges the inner and outer valve members 40 and 42 to their initial positions.

The inner and outer valve members 40 and 42 have the same construction and cooperate with each other and the torsion bar 102 in the same manner as is described in U.S. Pat. No. 4,276,812 issued Jul. 7, 1981 and entitled "Power Steering Valve and Method of Making the Same". However, the inner and outer valve members 40 and 42 could have a different construction if desired.

Power Steering Resistance Control System

A power steering resistance control system 110 (FIG. 1) decreases the force which is required to actuate the power steering control valve 22 as vehicle speed decreases. Thus, at relatively low vehicle speeds, a small force is required to rotate the inner valve member 40 relative to the outer valve member 42. At relatively high vehicle speeds, a larger force is required to rotate the inner valve member 40 relative to the outer valve member 42.

The power steering resistance control system 110 includes a speed responsive control unit 112 and a force transmitting assembly 114 which are disposed in the housing 44. The force transmitting assembly 114 includes an annular force transmitting member or slider 116 (FIG. 1). The force transmitting member 116 rotates about its central axis 46 with the inner valve member 40 and valve stem 50. Although the force transmitting member 116 rotates with the inner valve member 40 and valve stem 50, the force transmitting member 116 is movable axially along the valve stem 50.

Figure 2:
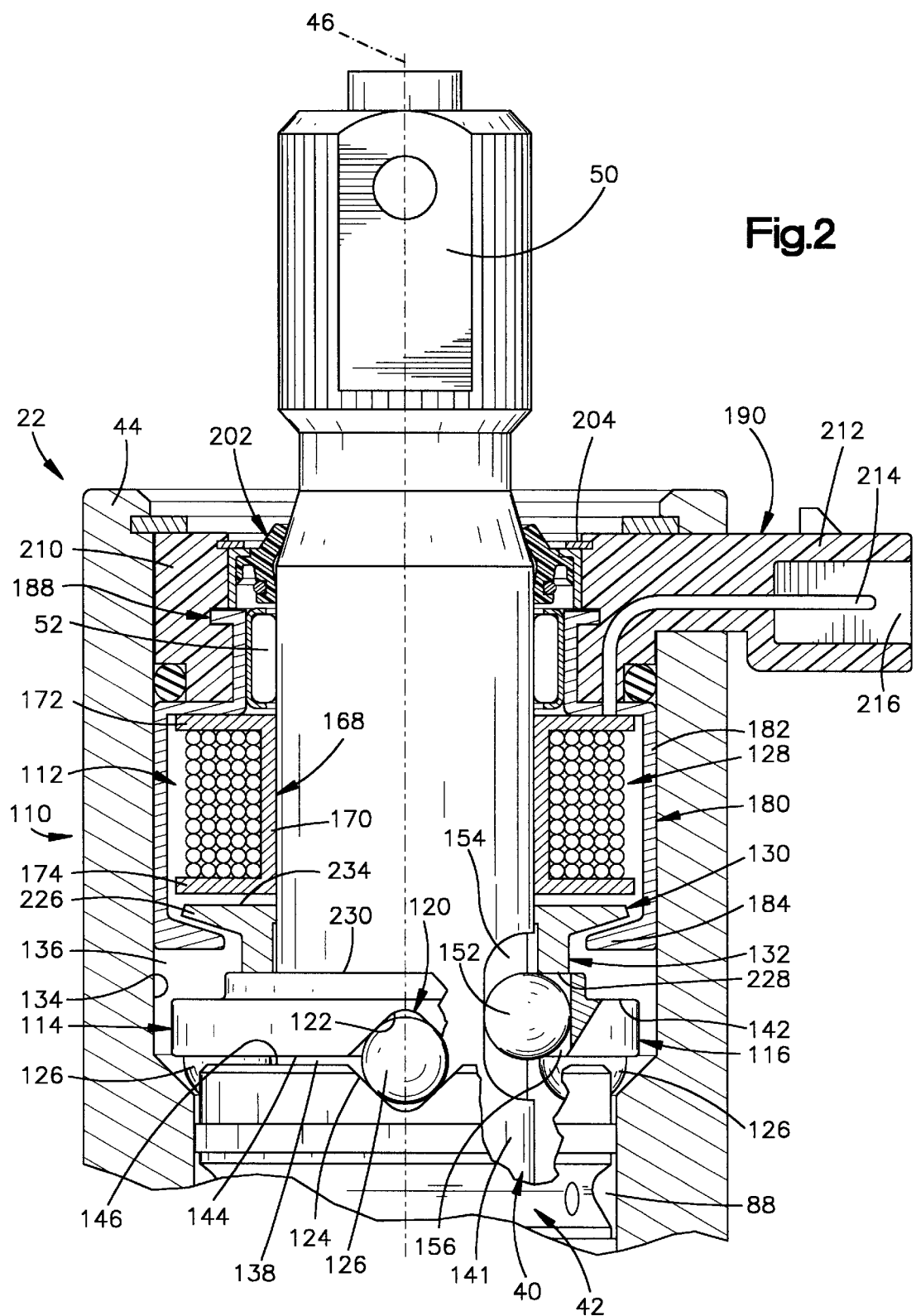
FIG. 2 is an enlarged fragmentary sectional view of a portion of FIG. 1.

The force transmitting assembly 114 also includes a cam assembly 120 (FIG. 2). The cam assembly 120 includes a plurality of downward (as shown in FIG. 2) facing cam surfaces 122 on the force transmitting member 116, a plurality of upward (as shown in FIG. 2) facing cam surfaces 124 on the outer valve member 42, and a plurality of balls or spherical cam elements 126. In the illustrated embodiment of the invention, there are four cam elements or balls 126 disposed between four pairs of cam surfaces 122 and 124 formed on the force transmitting member 116 and outer valve member 42. However, a greater or lesser number of cam elements 126 and cam surfaces 122 and 124 could be used if desired.

The force transmitting member 116 is urged axially toward the outer valve member 42 by a the speed responsive control unit 112. The speed responsive control unit 112 includes a cylindrical coil 128 which has an annular cross sectional configuration and provides a magnetic field which acts on an annular actuator member 130 in an actuator assembly 132. The coil 128 is disposed in the housing 44 in a coaxial relationship with and circumscribes the valve stem 50. The annular force transmitting member 116 and annular actuator member 130 are disposed in the housing 44 in a coaxial relationship with the coil 128 and circumscribe the valve stem 50.

Downward (as viewed in FIGS. 1 and 2) force is applied against the force transmitting member 116 by the actuator member 130. This downward force varies as a function of variations in the strength of the magnetic field provided by the coil 128. The downward force applied against the force transmitting member 116 by the actuator member 130 presses the cam surfaces 122 and 124 against opposite sides of the balls 126. The downward force applied against the balls 126 by the force transmitting member 116 centers the balls on the cam surfaces 122 and 124.

The annular force transmitting member 116 cooperates with a cylindrical inner side surface 134 of the housing 44 to form a cylindrical coil chamber 136 in which the coil 128 and actuator assembly 132 are disposed. An annular upper side 142 of the force transmitting member 116 cooperates with the cylindrical inner side surface 134 of the housing 44 to partially define the coil chamber 136. Similarly, an annular lower side 144 of the force transmitting member 116 cooperates with the inner side surface 134 of the housing 44 and an outer side surface 141 of the valve stem 50 to partially define an annular chamber 138 in which the balls 126 are disposed.

Rotation of the valve stem 50 (FIG. 1) and inner valve member 40 relative to the housing 44 and outer valve member 42 is resisted by the speed responsive control unit 112 and force transmitting assembly 114 with a force which is a function of the strength of a magnetic field provided by the coil 128. As the valve stem 50 is rotated from the initial position shown in FIG. 2 toward a fully actuated position, the outer side surface on the cam elements or balls 126 roll on the cam surfaces 122 and 124 as the force transmitting member 116 is rotated about the axis 46. As this occurs, the force transmitting member 116 is moved upward from the position shown in FIG. 2 against the influence of force applied against the force transmitted by the actuator assembly 132. As the upper side 144 of the force transmitting member 116 moves away from an annular upper end 146 of the outer valve member 42, the size of the chamber 138 is increased and the size of the coil chamber 136 is decreased.

The force required to roll the spherical force transmitting elements 126 on the cam surfaces 122 and 124 and to move the force transmitting member 116 away from the end 146 of the outer valve member 42 varies as a function of the force urging the force transmitting member 116 toward the outer valve member 42. Thus, the greater the force pressing the force transmitting member 116 against the balls 126, the greater is the force required to rotate the valve stem 50 from the initial position of FIG. 2. The force pressing the force transmitting member 116 against the cam elements 126 varies as a function of the strength of a magnetic field provided by the coil 128.

A pair of retaining elements or balls 152, only one of which is shown in FIGS. 1 and 2, interconnect the force transmitting member 116 and the valve stem 50 to hold the force transmitting member against rotation relative to the valve stem while allowing the force transmitting member 116 to move axially relative to the valve stem 50. The spherical retaining elements 152 engage a pair of diametrically opposite grooves 154 formed in the valve stem 50 and a pair of axially extending grooves 156 formed in the force transmitting member 116.

In the illustrated embodiment of the invention, the magnetic field from the coil 128 urges the annular actuator member 130 downward (as viewed in FIG. 2) toward the force transmitting member 116 against the influence of a biasing spring. Therefore, the force required to rotate the valve stem 50 from the initial position of FIG. 2 increases as the strength of the magnetic field from the coil 128 increases. However, the power steering resistance control system 110 could be constructed so that the magnetic field from the coil 128 urges the actuator member 130 upward away from the force transmitting member 116 against the influence of a biasing spring. With such a construction, the force required to rotate the valve stem 50 from the initial position of FIG. 2 would decrease as the strength of the magnetic field from the coil 128 increases. Therefore, the strength of the magnetic field from the coil 128 would, in this alternative embodiment, decrease as vehicle speed increases.

The construction of the force transmitting assembly 114 and the manner in which it cooperates with the inner and outer valve members 40 and 42 is the same as is disclosed in U.S. Pat. No. 4,819,545 issued Apr. 11, 1989 and entitled "Power Steering System". However, it should be understood that the force transmitting assembly 114 could have a different construction from the specific construction disclosed herein.

Speed Responsive Control Unit

In accordance with a feature of the present invention, the speed responsive control unit 112 is operable to actuate the force transmitting assembly 114 to vary the force which resists relative rotation between the inner and outer valve members 40 and 42 as a function of vehicle speed. A control unit 162 is connected with the coil 128 through an electrical conductor 164 (FIG. 1). The control unit is effective to vary the current which energizes the coil 128 as a function of variations in vehicle speed. In the embodiment of the invention illustrated in FIG. 1, the greater the vehicle speed, the greater is the current which is conducted from the control unit 162 through the conductor 164 to the coil 128.

As the speed of the vehicle in which the power steering system 12 is installed increases, the current which energizes the coil 128 increases so that the magnetic field provided by the coil increases in strength. The magnetic field provided by the coil 128 is effective to press the actuator member 130 in the actuator assembly 132 downward (as viewed in FIGS. 1 and 2) against the force transmitting member 116 in the force transmitting assembly 114. The downward force transmitted from the force transmitting member 116 to the balls 126 increases the resistance to relative rotation between the inner and outer valve members 40 and 42.

Figure 3:
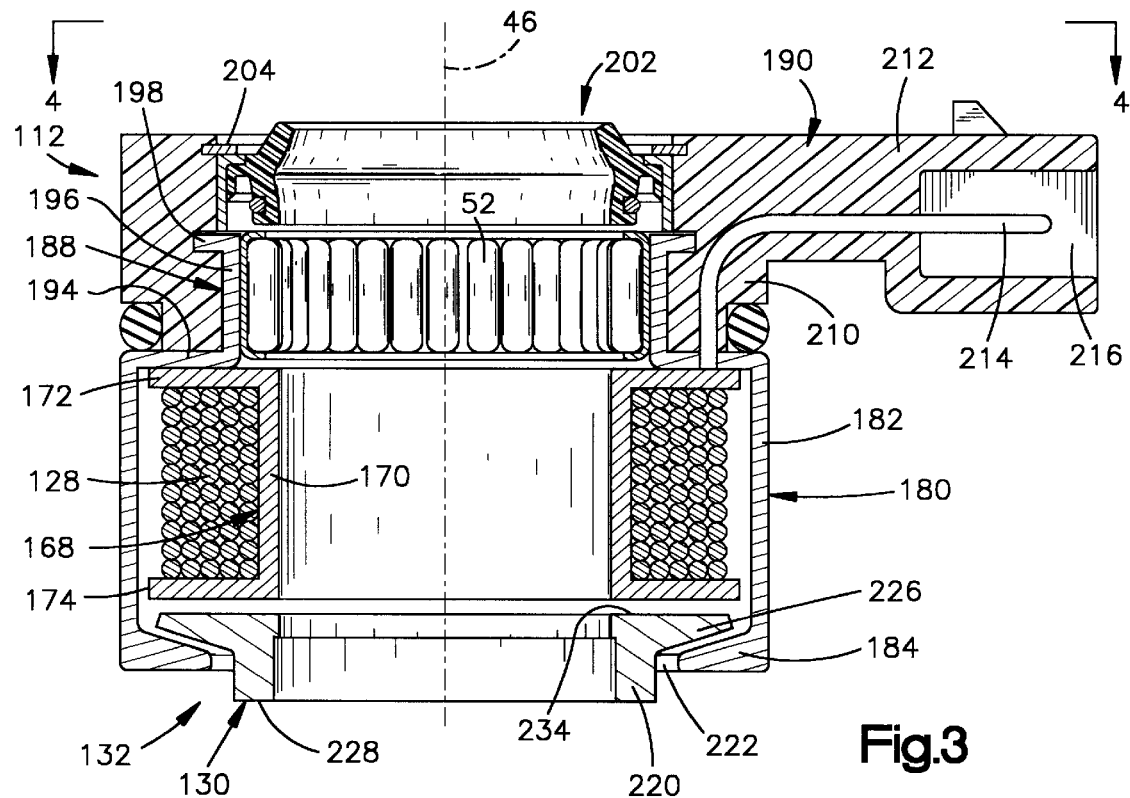
FIG. 3 is an enlarged sectional view of a speed responsive control unit used in the power steering control valve of FIG. 1.

The coil 128 has an annular configuration and is disposed on a retainer 168 (FIGS. 2 and 3). The retainer 168 includes a tubular cylindrical side wall 170 which extends around the valve stem 50. A pair of annular flanges 172 and 174 extend radially outward from the cylindrical side wall 170. The coil 128 is held between the flanges 172 and 174.

A one-piece housing 180 (FIGS. 2 and 3) encloses the coil 128. The housing 180 includes a cylindrical side wall 182 having a radially inwardly projecting annular lower flange 184. The lower flange 184 has a central axis which is coincident with the central axis 46 of the inner and outer valve members 40 and 42 and the housing 44 of the power steering control valve 22.

The housing 180 has a mounting section 188 (FIG. 3) which connects the housing with a base 190. The mounting section 188 includes a radially inwardly extending annular flange 194 (FIG. 3) which is integrally formed as one piece with the side wall 182. A cylindrical wall 196 extends axially upward (as viewed in FIG. 3) from the flange 194 to an annular upper flange 198. The housing 180 is formed of a metal which can be magnetized (iron). The housing 180 is fixedly connected with the upper flange 172 on the retainer 168 so that the coil 128 is supported from the flange 194 of the mounting section 188 of the housing 180.

The bearing 52 which rotatably supports the stem portion 50 of the inner valve member 40 (FIG. 1), is mounted in the wall 196 of the mounting section 188. A suitable seal 202 is mounted axially outward of the bearing 52 and sealingly engages the stem portion 50 of the inner valve member 40 (FIG. 2). The seal 202 is held in the base 190 by a retainer clip 204 (FIGS. 3 and 4).

The base 190 is formed of a suitable polymeric material and has an annular main section 210 (FIG. 4) which is disposed within the housing 44 of the power steering control valve 22 (FIG. 2). The mounting section 188 (FIG. 3) of the housing 180 for coil 128 is fixedly connected with the main section 210 of the base 190. Therefore, when the base 190 is mounted in the housing 44, the coil 128 is positioned in the coil chamber 136.

Figure 4:
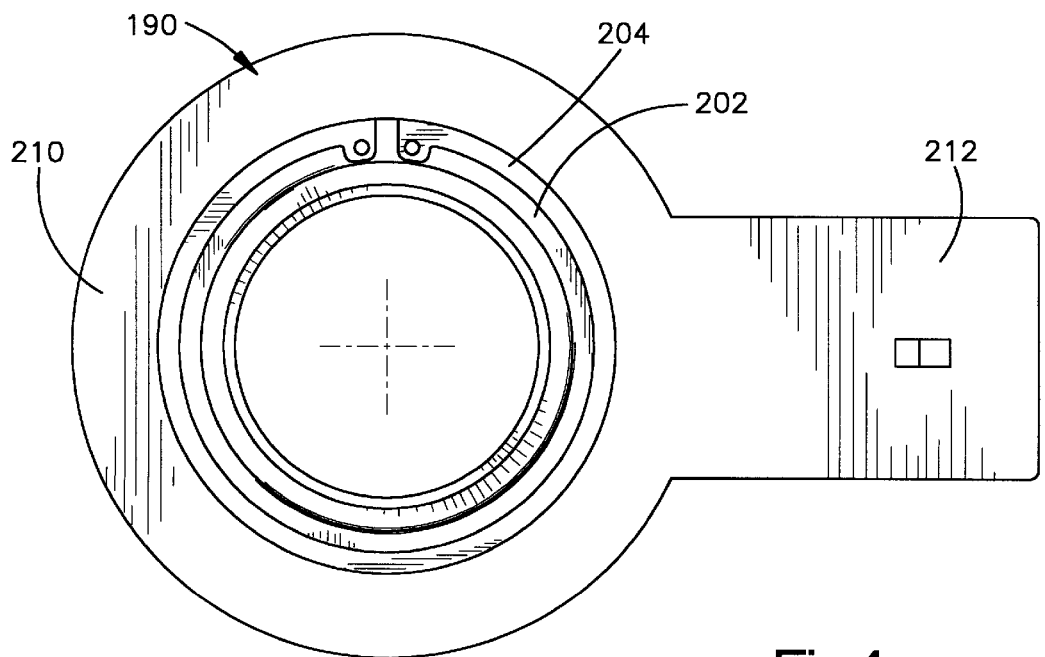
FIG. 4 is a plan view taken generally along the line 4—4 of FIG. 3, further illustrating the construction of the speed responsive control unit.

The base 190 also includes a connector section 212 which extends radially outward from the annular main section 210 of the base (FIG. 4). A lead 214 (FIG. 3) is provided in a socket 216 formed in the connector section 212. The lead 214 is connected with the control unit 162 (FIG. 1) through the electrical conductor 164.

The actuator assembly 132 includes the annular one-piece actuator member 130 (FIGS. 2 and 3). The actuator member 130 is formed of a metal which can be magnetized (iron). The actuator member 130 has a cylindrical body section 220 (FIG. 3). The body section 220 extends axially through a circular opening 222 defined by the annular lower flange 184 of the housing 180 which encloses the coil 128.

In addition, the one-piece actuator member 130 includes an annular rim 226 (FIG. 3) which projects radially outward from the cylindrical body section 220. The annular rim 226 is disposed in a coaxial relationship with the annular lower flange 184 of the housing 180. The rim 226 on the actuator member 130 is disposed in an overlapping relationship with the lower flange 184 of the housing 180.

The body section 220 of the actuator member 130 has an annular lower side surface 228 which is disposed in abutting engagement with an annular upper side surface 230 (FIG. 2) on the force transmitting member 116. If desired, a suitable spring, such as a wave or leaf spring could be provided between an annular upper side surface 234 on the rim 226 of the actuator member 130 and the lower flange 174 of the coil retainer 168 (FIGS. 2 and 3). Any spring provided between the actuator member 130 and the retainer 168 would press the actuator member against the force transmitting member 116 with a relatively light preload force to maintain the balls 126 in engagement with the cam surfaces 122 and 124.

Operation

During operation of the vehicle in which the power steering control valve 22 (FIG. 1) is installed, the control unit 162 is effective to provide an output signal which varies as a function of vehicle speed. Thus, the greater the vehicle speed, the greater the output signal from the control unit 162. The output signal from the control unit 162 energizes the coil 128 to provide a magnetic field. The strength of the magnetic field provided by the coil 128 varies as a direct function of the electrical output signal which is provided by the control unit 162. Thus, the faster the vehicle is traveling, the greater is the magnitude of the electrical signal provided by the control unit 162 and the greater is the strength of the magnetic field provided by the coil 128.

The magnetic field provided by the coil 128 is conducted through the coil housing 180 and through the actuator member 130. Thus, the magnetic field from the coil 128 is conducted through the side wall 182 (FIG. 3) and lower flange 184 of the coil housing 180. The magnetic field is also conducted through the rim 226 of the actuator member 130. This results in the rim 226 of the actuator member 130 being attracted downward (as viewed in FIGS. 2 and 3) toward the lower flange 184 of the housing 180.

The downward attraction between the rim 226 of the actuator member 130 and the lower flange 184 of the housing 180 results in the end surface 228 of the actuator member 130 being pressed against the upper side surface 230 of the force transmitting member 116 with a force which varies as a function of the strength of the magnetic field provided by the coil 128. Therefore, the actuator member 130 is pressed against the force transmitting member 116 with a force which varies as a direct function of variations in the strength of the magnetic field provided by the coil 128 and the speed of the vehicle in which the power steering control valve 22 is installed.

When the vehicle in which the power steering control valve 22 is installed is traveling at a low speed, the actuator member 130 is pressed against the force transmitting member 116 with a relatively small force under the influence of the relatively weak magnetic field provided by the coil 128. Upon initiation of a low speed steering operation, the inner valve member 40 rotates relative to the outer valve member 42. The force transmitting member 116 rotates with the inner valve member 40 relative to the outer valve member 42. This results in the cam surfaces 122 (FIG. 2) on the force transmitting member 116 and the cam surfaces 124 on the outer valve member 42 cooperating with the balls 126 to move the force transmitting member 116 axially upward, as viewed in FIG. 2. As the force transmitting member 116 moves upward, the actuator member 130 is moved upward.

Upward movement of the actuator member 130 with the force transmitting member 116 is resisted by the magnetic field provided by the coil 128. Thus, as the force transmitting member 116 moves axially upward (as viewed in FIG. 2), the actuator member 130 moves upward and the rim 226 on the actuator member 130 moves away from the lower flange 184 on the housing 180. The magnetic field provided by the coil 128 resists movement of the rim 226 on the actuator member 130 away from the lower flange 184 on the housing 180.

Since the field provided by the coil 128 is relatively weak, the force resisting upward movement of the actuator member 132 is relatively weak. Therefore, the force which opposes upward movement of the force transmitting member 116 is relatively weak. As a result, relatively little force is required to rotate the inner valve member 40 relative to the outer valve member 42. Therefore, the torque required to actuate the power steering control valve 22 is relatively small during operation of the vehicle at low speeds.

Upon completion of a low speed steering operation, the inner and outer valve members 40 and 42 are rotated back to their initial or unactuated positions relative to each other. As this occurs, the cam surfaces 122 and 124 cooperate with the balls 126 to enable the force transmitting member 116 to move downward, as viewed in FIG. 2. As this occurs, the rim 226 on the actuator member 130 moves downward toward the lower flange 184 of the housing 180.

During operation of the vehicle at higher speeds, the control unit 162 provides a higher voltage output signal to the coil 128. The resulting increase in the current conducted through the coil 128 results in an increase in the strength of the magnetic field provided by the coil 128. Increasing the strength of the magnetic field provided by the coil 128 increases the strength of the magnetic field acting on the rim portion 226 of the actuator member 130. Therefore, the force urging the actuator member downward toward the lower flange 184 on the housing 180 and toward the force transmitting assembly 114 increases.

Upon actuation of the steering control valve 22 at relatively high vehicle speeds, the inner valve member 40 is rotated relative to the outer valve member 42. However, since the magnetic field from the coil 128 is relatively strong, the actuator member 130 is pressed against the force transmitting assembly 114 with a relatively large force. The force applied against the force transmitting assembly 114 by the actuator member 130 must be overcome by the cam assembly 120 in order to rotate the inner valve member 40 relative to the outer valve member 42.

As the inner valve member 40 rotates relative to the outer valve member 42, the force transmitting member 116 and actuator member 130 are both moved axially upward, as viewed in FIG. 2. Upward movement of the actuator member 130 is resisted by the relatively strong magnetic field provided by the coil 128. Therefore, the input force which is required to turn the steering wheel and rotate the inner valve member 40 relative to the outer valve member 42 is greater when the vehicle is traveling at a relatively high speed than when the vehicle is traveling at a relatively low speed.

When the steering operation is completed during operation of the vehicle at a relatively high speed, the inner and outer valve members 40 and 42 are returned to their initial or unactuated positions relative to each other. As this occurs, the balls 126 move along the cam surfaces 122 and 124 and the magnetic field provided by the coil 128 moves the actuator member 130 and force transmitting member 116 downward to their initial positions shown in FIG. 2.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for use in a vehicle to control a flow of fluid to a power steering motor, said apparatus comprising:

a housing adapted to be connected with a fluid supply conduit and the power steering motor;

first and second valve members disposed in said housing and rotatable relative to each other to control fluid flow from the fluid supply conduit to the power steering motor;

force transmitting means for resisting relative rotation between said first and second valve members with a force which varies as a function of variations in force applied against said force transmitting means;

an actuator member through which force is applied against said force transmitting means; and electromagnetic means for providing a magnetic field which acts on said actuator member to vary the force transmitted through said actuator member to said force transmitting means.

2. An apparatus as set forth in claim 1 wherein said electromagnetic means is disposed in said housing and has a central axis which is coincident with an axis about which said first and second valve members are rotatable relative to each other.

3. An apparatus as set forth in claim 2 wherein said force transmitting means is disposed in said housing and has a central axis which is coincident with an axis about which said first and second valve members are rotatable relative to each other.

4. An apparatus as set forth in claim 2 wherein said actuator member is disposed in said housing and has a central axis which is coincident with an axis about which said first and second valve members are rotatable relative to each other.

5. An apparatus as set forth in claim 1 wherein said actuator member is pressed against said force transmitting means under the influence of the magnetic field provided by said electromagnetic means.

6. An apparatus as set forth in claim 1 wherein said force transmitting means includes a force transmitting member which is movable relative to said first and second valve members upon relative rotation between said first and second valve members, said actuator member being movable relative to said first and second valve members with said force transmitting member upon relative rotation between said first and second valve members.

7. An apparatus as set forth in claim 1 wherein said actuator member is movable along an axis about which at least one of said first and second valve members rotates upon relative rotation between said first and second valve members.

8. An apparatus as set forth in claim 1 wherein said actuator member is movable against the influence of the magnetic field provided by said electromagnetic means upon relative rotation between said first and second valve members.

9. An apparatus as set forth in claim 1 wherein the magnetic field provided by said electromagnetic means is variable to vary the force transmitted through said actuator member to said force transmitting means.

10. An apparatus as set forth in claim 1 wherein said force transmitting means includes a force transmitting member which is movable relative to said first and second valve members from a first position to a second position upon relative rotation between said first and second valve members, said electromagnetic means being operable to vary the force required to move said force transmitting member between the first and second positions.

11. An apparatus for use in a vehicle to control a flow of fluid to a power steering motor, said apparatus comprising:

a housing adapted to be connected with a fluid supply conduit and the power steering motor;

first and second valve members disposed in said housing and rotatable relative to each other to control fluid flow from the fluid supply conduit to the power steering motor;

a coil disposed in said housing and electrically energizable to provide a variable magnetic field;

force transmitting means disposed in said housing for providing a variable force which resists relative rotation between said first and second valve members; and actuator means disposed in said housing between said coil and said force transmitting means for effecting operation of said force transmitting means to vary the force which resists relative rotation between said first and second valve members as a function of variations in the magnetic field provided by said coil.

12. An apparatus as set forth in claim 11 wherein said first valve member extends through said coil and is rotatable relative to said coil.

13. An apparatus as set forth in claim 11 wherein said force transmitting means includes a force transmitting member which is movable toward said coil upon relative rotation between said first and second valve members, at least a portion of said actuator means being movable toward said coil with said force transmitting member upon relative rotation between said first and second valve members.

14. An apparatus as set forth in claim 13 wherein said force transmitting member is connected with said first valve member and is movable toward and away from said coil, said actuator means being operable to apply to said force transmitting member a force which varies to vary the resistance to relative movement between said first and second valve members as the magnetic field provided by said coil varies in strength.

15. An apparatus as set forth in claim 11 wherein said first and second valve members are rotatable relative to each other about a common central axis, said coil having a central axis which is coincident with the central axis of said first and second valve members.

16. An apparatus as set forth in claim 11 wherein said force transmitting means includes a first surface area which is connected with said first valve member, a second surface area connected with said second valve member and a member disposed between and in abutting engagement with said first and second surface areas, said actuator means being operable to vary force which presses said first surface area against said member as a function of variations in the magnetic field provided by said coil.

* * * * *